United States Patent [19]

Coleman

[11] 3,806,633

[45] Apr. 23, 1974

[54] MULTISPECTRAL DATA SENSOR AND DISPLAY SYSTEM

[75] Inventor: Clarence B. Coleman, Baltimore, Md.

[73] Assignee: Westinghouse Electric Corporation, Pittsburgh, Pa.

[22] Filed: Jan. 18, 1972

[21] Appl. No.: 218,730

[52] U.S. Cl. .......... 178/5.2 R
[51] Int. Cl. .......... Ho4n 9/02
[58] Field of Search .......... 178/5.2, 5.4, 6.8, DIG. 8

[56] References Cited

UNITED STATES PATENTS

| | | | |
|---|---|---|---|
| 3,571,504 | 3/1971 | Kiuchi et al. | 178/DIG. 8 |
| 3,673,317 | 6/1972 | Newell et al. | 178/5.2 R |

*Primary Examiner*—Richard Murray
*Attorney, Agent, or Firm*—C. L. O'Rourke

[57] ABSTRACT

Apparatus is disclosed for displaying images derived from image sensors sensitive to radiation of different spectral bands. In an illustrative embodiment of this invention, a first sensor is responsive to radiation in the visible band, whereas a second sensor is responsive to radiation images in the infrared (IR) band; video signals derived from the first and second sensors are displayed upon a suitable display device such as a color cathode tube (CRT). In accordance with the teachings of this invention, the video signals from the first sensor are processed and applied to the color CRT to provide a black and white display image in the absence of a video signal from the second sensor. The video signal derived from the second sensor is processed and applied to the color CRT to display the sensed infrared image in various visual colors (or wave-lengths of radiation). dependent upon whether the portions of the viewed infrared image are "warmer" or "cooler" than a preselected reference point. For example, warmer objects within the viewed scene may be displayed as red, whereas cooler objects may be displayed as blue or green. Suitable gain control is associated with the video signal derived from second sensor to insure that the presentation of the color image upon the CRT is independent of the visual video signal derived from the first sensor. In an illustrative embodiment of this invention, a DC signal is derived indicative of the amplitude of the first video signal and is used to control the gain of the IR video signal.

7 Claims, 7 Drawing Figures

MULTISPECTRAL DATA SENSOR AND DISPLAY SYSTEM

BACKGROUND OF THE INVENTION

1. Field of the Invention

This invention relates to systems for displaying images representative of at least two different bands of radiation, and in particular to systems for displaying readily recognizable images corresponding to visual and infrared bands of radiation.

2. Description of the Prior Art

Electro-optical imaging systems have been used to detect obscure objects within a specified scene. In military situations where it is desirable to detect objects under conditions of low illumination, specially adapted television cameras have been used for sensing and intensifying images. For example, such a system could be used at night to detect targets and to direct firing toward the observed target. Even with such electro-optical devices, the contrast of the target with its background may be such as to avoid easy recognition. However, such targets may generate thermal energy which may be detected by suitable infrared (IR) sensors. Electro-optical imaging systems with spectral responses to both the visual and the infrared bands have been employed to increase target detection and range recognition, as compared with detection systems responsive to but a single spectral band. The use of infrared detection adds in a sense a new dimension, i.e., temperature, to the recognition capability of a detection system.

In the prior art, systems have been developed for detecting and displaying images of first and second spectral bands. In a further system, a single CRT is associated with two sensing devices, for displaying sequentially one image at a time from each of the sensors of different spectral bands. In a still further display system, a CRT has been used for the simultaneous display of images sensed by sensors of different spectral bands. In this system, first and second sensors are provided for generating signals corresponding to different spectral bands. The two video signals are mixed and are applied to the electron gun of a CRT for simultaneously modulating the generated electron beam. Alternatively, the video signals may be applied to the individual electron gun of a color CRT to separately control the beam intensities and therefore the displayed colors corresponding to the beams. In such systems, the video signal from one of the sensors may be pulsed at a few cycles per second to alert the operator to the presence of data from that sensor and to aid the operator identifying the sensor providing the pulsing signal. In particular, a first sensor is adapted to detect radiation in the visible band and its video signal is applied to control the display of green upon the color CRT, while the second sensor is adapted to sense radiation within the IR band and to control the display of red upon the color CRT. Assuming angular registration between the sensors, a problem exists wherein the displayed image varies with both visual and infrared signal intensity in a manner tha does not really facilitate target detection and identification.

SUMMARY OF THE INVENTION

It is therefore an object of this invention to provide a new and improved multi-spectral sensor system in which the images corresponding to the different spectral bands are displayed in a manner to assist easy recognition of the objects to be detected.

It is a still further object of this invention to provide a display system for receiving and displaying video signals representative of images in a first band, e.g., visual radiation, and of a second band, e.g., infrared radiation, and for displaying simultaneously the visual image in black and white and the infrared video signal in color.

The subject invention achieves the abovementioned and additional objects and advantages by providing a new and improved multi-spectral sensor display system, comprising a first sensor for detecting and providing a video signal corresponding to sensed radiation of a first spectral band, e.g., visual radiation, and a second sensor for detecting and providing a video signal corresponding to sensed radiation of a second spectral band, e.g., infrared radiation. The first and second video signals are applied to a display device capable of displaying black and white, and color images. In an illustrative embodiment of this invention, there is included a cathode ray tube CRT having at least two electron guns, each for generating a distinct color as it is swept across the display surface of the CRT. The visual video signal is processed and applied to the electron guns of the CRT to provide a black and white image in the absence of the IR video signal. The IR video signal is processed and applied to the electron guns of the CRT, so that the "temperature image" of the scene is displayed upon the CRT as various colors dependent upon their object temperature and therefore the intensity of the sensed IR radiation.

In an illustrative embodiment of this invention, the first and second sensors are adapted to sense and to provide video signals corresponding to visual and infrared radiation respectively. Further, the display color image may be made substantially independent of intensity of illumination by providing suitable gain control for the visual video signal; as a result, the color image is made dependent solely upon the magnitude (amplitude) of the detected infrared video signal.

BRIEF DESCRIPTION OF THE DRAWINGS

These and other objects and advantages of the present invention will become more apparent by referring to the following detailed description and accompanying drawings, in which.

DETAILED DESCRIPTION OF THE PREFERRED EMBODIMENTS

Figure 1:
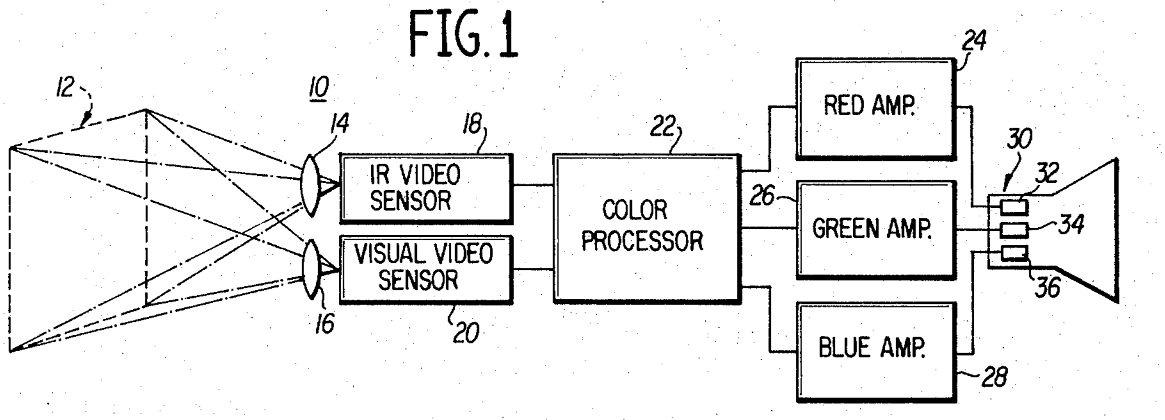
FIG. 1 is a schematic diagram of a multi-spectral sensor display system in accordance with the teachings of this invention.

With regard to the drawings and in particular to FIG. 1, there is shown a multi-spectral sensor display system 10 in accordance with the teachings of this invention. In particular, the display system 10 includes a second video sensor 18, disposed to sense radiation emanating from a scene 12 in which it is desired to detect and display obscure objects. Illustratively, the display system 10 may be used in military situations where it is desired to detect objects which are obscure or lack contrast with the background and which may be detected more readily by some other characteristic such as their thermal generation. To detect such heat generating objects, the second video sensor 18 is made responsive to radiation in the infrared (IR) spectral band to provide a video signal corresponding to the detected IR image. As shown in FIG. 1, a lens 14 is disposed to focus the infrared image on to the sensor 18. In a similar fashion, a first or visual video sensor 20 is disposed to receive reflected radiation focused thereon by a lens 16. The visual video sensor 20 is sensitive to radiation in the visual range, i.e., 4,000 A to 9,000 A° and to provide a video signal corresponding to the detected radiation in the visual spectral band. In an illustrative embodiment of this invention, the visual video sensor 20 may take the form of a television picture tube similar to the Vidicon tube. For military applications it may be desired to use a lower light level camera. The IR video sensor 18 may thus take the form of a television camera tube sensitive to infrared radiation such as the "Thermicon Tube", as manufactured by the assignee of this invention. In other embodiments, mechanical scanners may be used for directing the infrared radiation derived from the scene 12 over an array of infrared detectors such as semiconductive elements of Mercury Cadmium Telluride. Typically, the image detection could be performed to provide a two dimension video signal by scanning a mirror, by counter-rotating a pair of prisms, or by scanning the array itself.

The video signals generated by the video sensors 18 and 20 are applied to a color processor 22, where they are approximately processed and combined to control the electron mission from first, second and third electron guns 32, 34 and 36 of color cathode tube (CRT) 30. More specifically, three distinct signals are amplified respectively by red, green and blue amplifiers 24, 26 and 28 to be applied to the electron guns 32, 34 and 36. The color CRT 30 employed in an illustrative system of this invention can be a three gun CRT as is normally used in commercial, U.S. color TV. Alternatively, the display device 30 may take the form of a two color tube with the result that, as will become apparent, the desired black and white picture may be presented with an overcast of a color. Further, the range of hues achieved with a two color CRT is less than that which may be achieved with a three gun (hue) CRT. Other types of color CRT's such as the color stripe Chromaton and a single gun, two or three beam Trinitron or combinations of these can also be used in the disclosed system of this invention.

A discussion of conventional color television practices in the U.S. will facilitate a further understanding of the display system in accordance with the teachings of this invention. In U.S. color television, three video sensors are disposed to sense simultaneously the same scene. The three TV sensors are filtered so that the spectral responses peak respectively in the red, green and blue regions of the visual spectral band. Compatibility is a significant requirement of such color TV and is accomplished by modulating the signal transmitted from the television station with two signals; i.e., the black and white signal and the color signal. As a result, black and white receivers may recover only the black and white modulation while the color TV receiver may receive and display both the black and white and the color signals.

The black and white video signal is termed the "M" signal and it is obtained from the red, green and blue sensors by summing in appropriate proportions the red (R), green (G), and blue (B) video signals as follows:

$$M = 0.30\,R + 0.59G + 0.11\,B.$$

The color signal is derived from the R, G and B video signals and is further separated into the two following video signals I and Q:

$I = 0.60R - 0.28G - 0.32B$; and $Q = 0.21R - 0.52G + 0.31B$.

In a typical color receiver, the demodulated "M" signal is applied to the cathode element of all three electron guns of said color CRT. Since white may be represented by the presence of all colors, all three electron guns may be energized in proper proportion so that a white object may be displayed upon the color CRT. In order to display a color picture, the demodulated I and Q signals are summed and applied to the control grids of the red, green and blue electron guns of the color CRT as follows:

$R = I + Q$ $G = -I - Q$ $B = -I + Q$.

As will become apparent, it is desire to display similarly the video signal provided by the visual video sensor 20 as a black and white image upon the color CRT 30, while it is desired to use the video signal provided by the IR video sensor 18 to add color to the black and white image dependent upon the sensed IR radiation.

Before describing a specific embodiment of the color processor 22, it will be helpful to examine the information that each of the video sensors 18 and 20 provides. The image displayed upon a CRT corresponding to visual radiation is familiar to an operator since it is equivalent to his viewing of the scene directly. In contrast, the IR image corresponding to the thermal energy generated by the object within the scene is not familiar to the operator. However, it is an object of this invention to sense and display the infrared image in combination with the visual image in a manner that will be easily recognizable and meaningful to the operator. In this manner, infrared spectral data can add a new dimension, i.e., scene temperature, to the displayed picture.

In evaluating a scene where each object has equal temperature and therefore radiates IR radiation of equal intensity, the IR video sensor 18 generates no signal. This condition is approximated by a natural scene, (i.e., no man-made objects) after heavy rain. According to the teachings of this inventon, it is desired to present such a scene with no IR signal, as a black and white image to the operator. Further, it is desired to display a color image so that objects cooler than scene average appear as a first color and that objects warmer than the scene average appear as a second color. It is apparent that with conventional color CRT's the first color may be chosen arbitrarily to be red, green or blue or a combination thereof. In an illustrative embodiment of this invention, objects warmer than the scene average may be presented as light yellow through orange to saturated red as the object temperature increases. In this illustrative embodiment, objects cooler than scene average may appear as light green, through blue to violet, as the object temperature decreases.

It is a significant aspect of this invention that the visual video signal derived from sensor 20 controls only luminosity, whereas the video IR signal derived from the sensor 18 controls only hue. This arrangement is similar to commerical color television wherein the wide band video signal controls picture luminosity only and the color subcarrier controls picture hue only. As will be explained later, the visual band video signal derived from the sensor 20 provide the M-signal equivalent of color TV, whereas the IR video sensor 18 is processed to provide equivalent I and Q signals.

Figure 2:
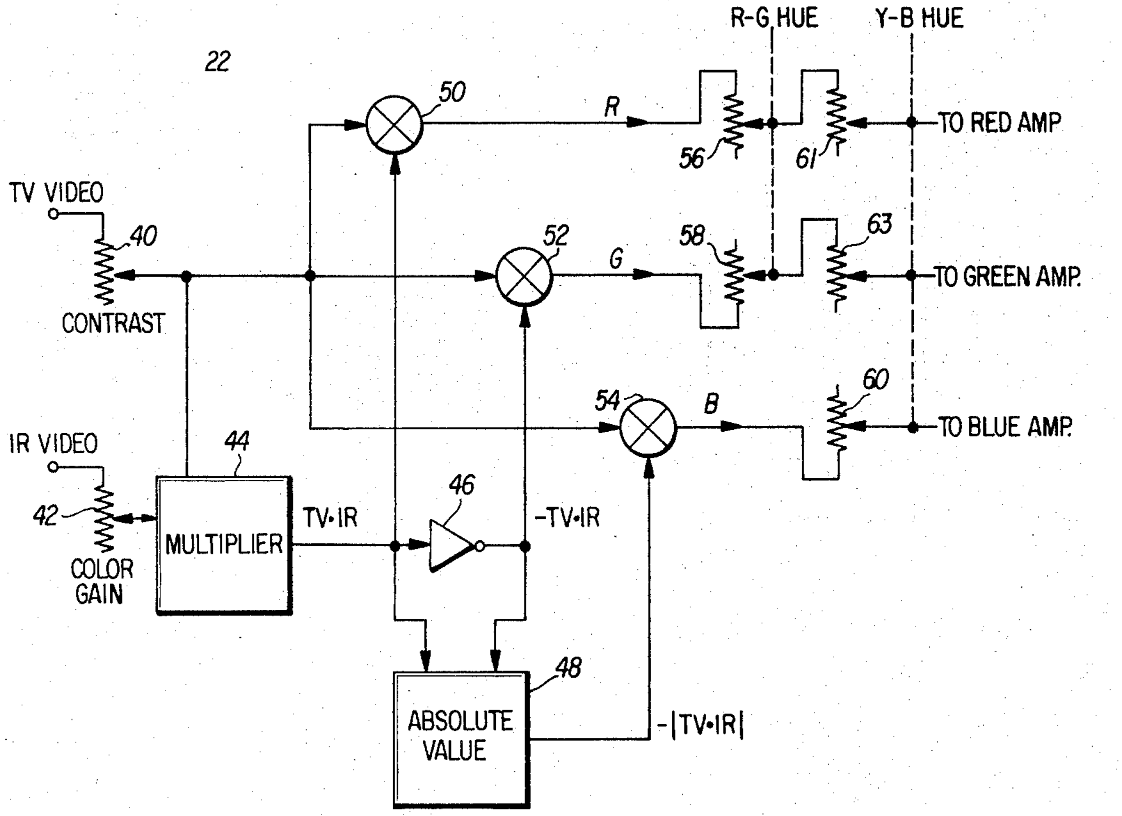
FIG. 2 is a schematic diagram of the color processing circuit shown in FIG. 1.

With reference to FIG. 2, there is shown an illustrative embodiment of the color processing circuit 22 as may be incorporated into the system 10 shown in FIG. 1. In particular, the visual video signal derived from the sensor 20 is applied to a variable impedance or potentiometer 40, while the IR video signal derived from the sensor 18 is applied to a variable impedance or potentiometer 42. The potentiometer 40 is connected to each of the summing circuits 50, 52 and 54, which are, in turn connected to variable impedences or potentiometers 56, 58 and 60, respectively. The signals derived from the potentiometer 56 and 58 are respectively applied to variable impedances or potentiometers 61 and 63. Output signals indicative of the desire intensity of the red, green and blue color components are derived respectively from potentiometers 61, 63 and 60 and are applied respectively to the red amplifier 24, the green amplifier 26 and the blue amplifier 28, as shown in FIG. 1.

An IR video signal is derived from the potentiometer 42 and applied to a multiplier 44. In an illustrative embodiment of this invention, the multiplier 44 may take the form of a modulator IC, such as the Motorola MC1596. The TV video signal as derived from the potentiometer 40 is also applied to the multiplier 44, which derives an output signal according to TV × IR, where IR corresponds to the IR video signal and TV corresponds to the visual video signal. As will be explained with respect to a further embodiment of this invention, the multiplier 44 may be thought of as a gain control circuit where the gain applied to the IR video signal is a function, i.e., DC component, of the visual video signal. The signal TV × IR is applied to an amplifier 46, an absolute value circuit 48 and the first summing circuit 50. The output signal derived from the amplifier 46 corresponds to −TV × IR and is applied to the second summing circuit 52 and to another input of the absolute value circuit 48. The absolute value circuit function to apply an output signal corresponding to −| TV × IR | to the third summing circuit 54.

As discussed above, a black and white picture may be displayed upon the CRT 30 by properly proportioning the energization of the red, green and blue guns. In the embodiment of the color processing circuit 22 shown in FIG. 3, the potentiometers 56 and 58 are "ganged" together to provide an adjustment of the red and green hue, whereas the potentiometer 61, 63 and 60 are "ganged" together to provide an adjustment of the yellow-blue hue. Thus, the red-green hue and the yellow-blue hue controls are adjusted in the absence of an IR video signal to achieve the proper amounts of red, blue and green energization to achieve the desired black and white display upon the CRT 30 corresponding to the visual video signal derived from the sensor 20.

The color processing circuit 22 operates to shift the color of the display according to the amplitude and polarity of the incoming IR video signal. In order to accomplish this, the portion of the IR signal applied to each electron gun of the CRT 30 is a function of the amplitude of the visual video signal. This condition implies a product function between the IR and TV video signals. The following equations provide the signals necessary so that in an illustrative embodiment where red indicates "hot" objects, green indicates "cold" objects and "white" corresponds to objects at zero threshold of the IR video signal:

$$R = TV\,(1 + IR);$$
$$G = TV\,(1 - IR);$$
$$B = TV\,(1 - |IR|),$$

where TV is positive only and IR may be either positive or negative. It is evident that the circuitry of the color processor 22 solves these equations and the signals applied respectively to the red amplifier 24, the green amplifier 26 and the blue amplifier 28 correspond respectively to he values R, G and B defined by above equations.

To understand the operation of these equations and therefore the circuit 22, assume that each object in the scene is the same temperature, i.e., no IR video signal. In this situation, all three electron beams of the CRT 30 are controlled by the visual video signal and their intensities will be adjusted as by the red-green hue and yellow-blue hue controls to provide a black and white picture. As indicated in FIG. 1, the IR video sensor 18 and the visual video sensor 20 are disposed in substantially perfect angular registration to view the same identical scene 12; this registration assures the IR video signal and the visual video signal may be superimposed upon the display screen of the color CRT 30. If a warmer than average object is sensed, a positive IR video signal will be applied to the multiplier 44. As a result, the signal applied to the red amplifier 24 and therefore the intensity of the red electron beam increases, whereas the signals applied to the green amplifier 26 and the blue amplifier 28 corresponding to the intensities of the blue and green electron beams, decrease. As a result, the hotter object in this illustrative embodiment will be displayed as red indicating a warmer than average scene object. Significantly, this object will be displayed as red, regardless of the intensity of the illumination scene, i.e., the amplitude of the video visual signal. If the IR video signal is negative, corresponding to a cooler than average scene object, the intensity of the red beam is decreased, while the intensities of the green and blue beams are increased, thereby displaying a green object. Thus, each object of the scene will be displayed in a hue which indicates its temperature with respect to adjacent elements. More specifically, in this illustrative embodiment, elements warmer than the scene average are displayed as yellow, orange or red, whereas elements cooler than scene average are displayed as green, blue or violet.

In an analogy with the conventional color system, the operator has three controls: (1) a video control taking the form of the potentiometer 40 for controlling the amplitude of the visual video signal; (2) a color control taking the form of a potentiometer 42 for controlling the gain or signal amplitude of the IR video signal; and (3) hue controls taking the form of the "ganged" potentiometers 56 and 58, and 61, 63 and 60 for controlling the relative amplitude of the IR video signal applied to the electron beam intensity modulation. These controls operate in a manner similar to that of commercial color television. In particular, the operator would first adjust the video control (picture in commercial TV) and then the color control for picture brightness and color content. In adjusting the system 10 to analyze a military scene, the operator would first adjust the hue so that an object such as a red would appear grey. Objects cooler than the road, such as vegetation, would be adjusted to appear as green, and military vehicles such as tanks, normally warmer than average, will appear red. Thus, the display system of this invention differs from the previously used color display techniques, where all visual spectral band data is of one color and all IR spectral data is of a second color with the resultant hue dependent upon the relative amplitudes of the sensor signal intensities. More specifically, in accordance with the teachings of this invention, the display system of this invention indicates whether a target (i.e., object being viewed) is warmer or cooler than an adjacent object and the hue thereof indicates the temperature difference with respect to the object temperature.

Figure 3:
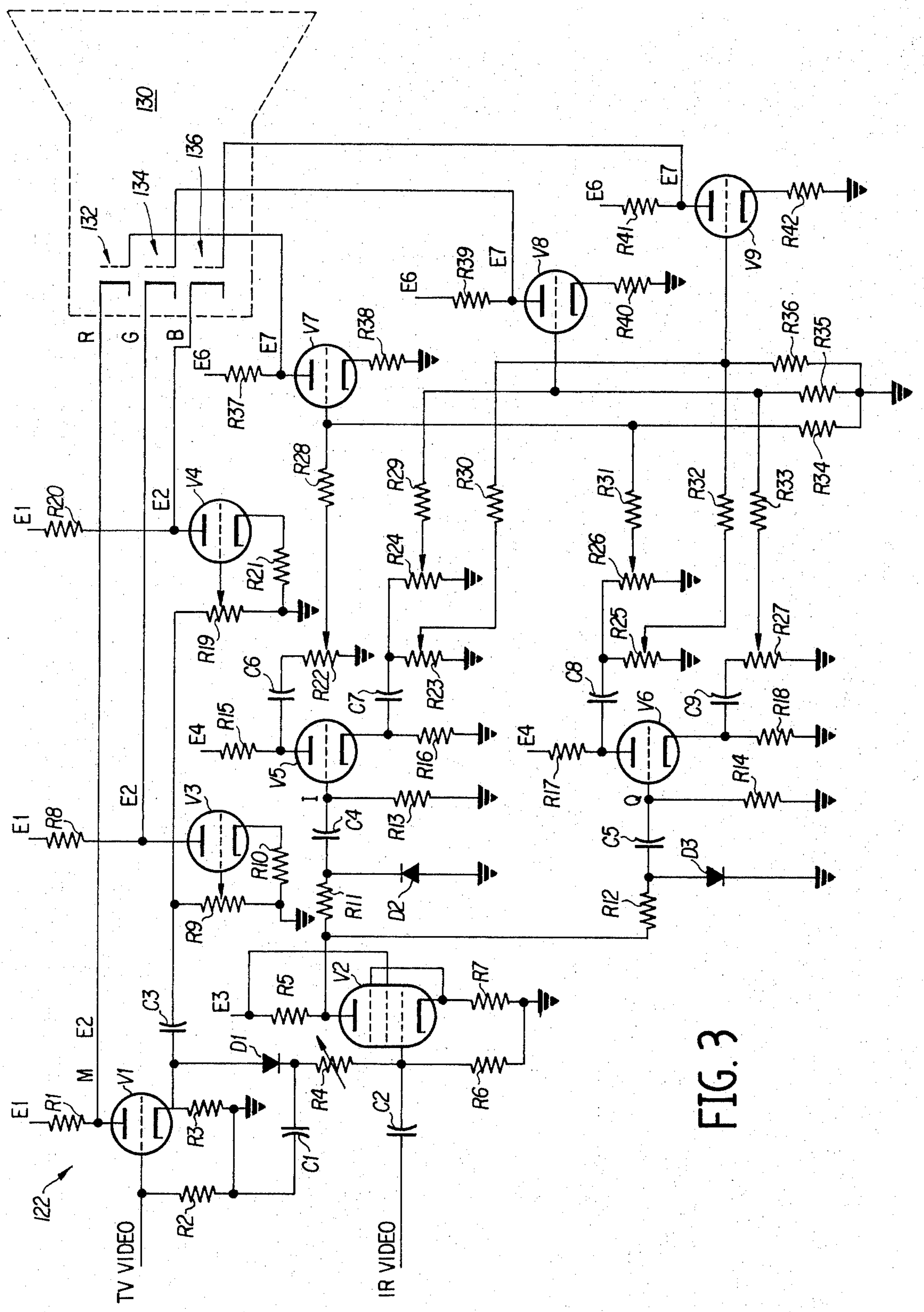
FIG. 3 is a schematic diagram of another color processing circuit to be incorporated into the diagram of FIG. 1.
Figure 4A:
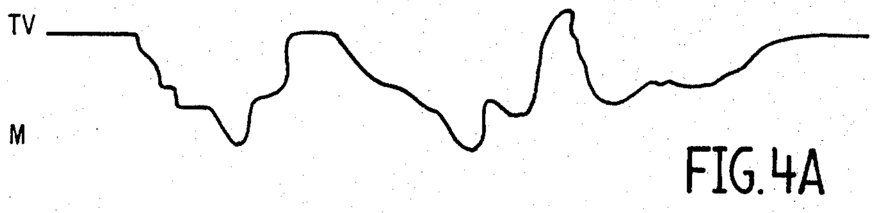
FIGS. 4A, B, C and D show graphical views selected signals generated in the circuit shown in FIG. 3.
Figure 4B:
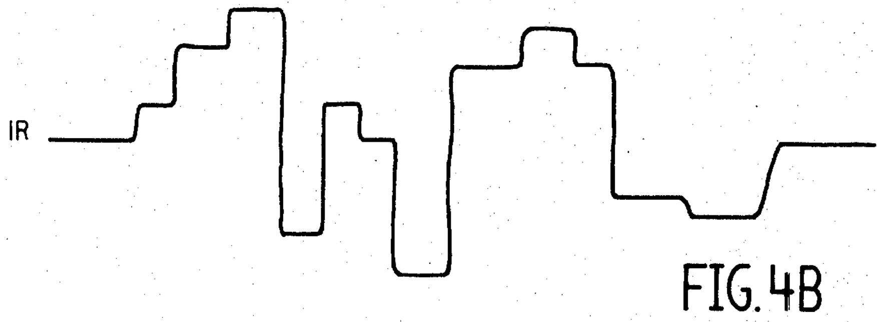
Figure 4C:
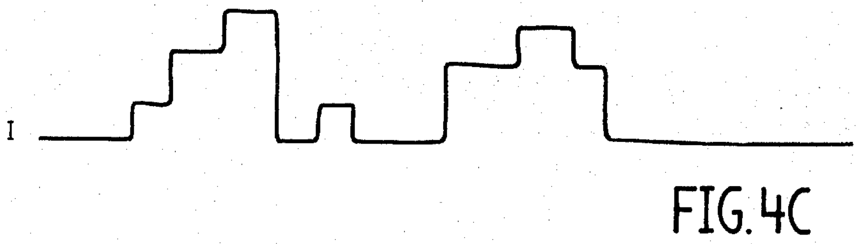
Figure 4D:
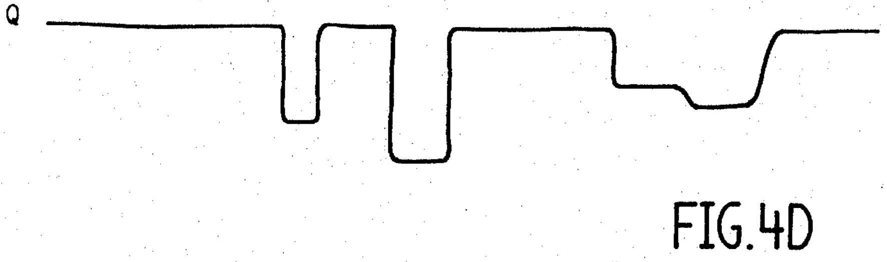

With regard to FIG. 3, there is shown an alternative embodiment of this invention for processing the IR video and visual video signals as derived respectively from sensors 18 and 20, for selectively energizing the electron guns 132, 134, 136 of a color CRT 130. The visual (TV) vide signal is applied through coupling vacuum tubes V1, V3 and V4 to the cathode elements of the electron guns 132, 134 and 136, which respectively energize the electron beams of the red, green and blue guns. In the absence of an IR video signal, i.e., the objects of the scene are of substantially the same temperature, the potentiometers R9 and R19 are adjusted to apply selected voltages to the cathode elements of electron guns 134 and 136, so that upon addition, the intensities of the electron beams and therefore the colors will be adjusted to provide a black and white image. The IR video signal is applied to a vacuum tube V2, the gain of which is varied in a manner to be explained. The amplitude of the IR video signal can be both positive and negative in contrast to the visual video signal, which is unidirectional. The visual video signal is represented in FIG. 4A whereas the IR video signal as shown in FIG. 4B to swing both negatively and positively. The IR video signal amplified by the vacuum tube V2 is applied to diodes D2 and D3 to provide respectively two unidirectional signals as shown in FIG. 4C and 4D. The positive signal rectified by diode D2 is applied to vacuum tube V5 and the negative going signal rectified by diode D3 is applied to vacuum tube V6. The amplified signals derived from the vacuum tubes V5 and V6 are applied to a summing matrix comprising resistors R22 and R36. Selected red, green and blue signals are derived from this summing matrix and are respectively amplified by the vacuum tubes V7, V8 and V9 to provide amplified red, green and blue signals to be applied to the grid elements of the electron guns 132, 134 and 136, respectively. In the absence of an IR video signal, the DC supply voltages E1 and E6 are selected to provide appropriate bias voltages E2 and E7 to the cathode and to the grid elements of the CRT electron guns. Then, the potentiometers R9 and R19 may be properly adjusted to balance the electron beam intensities and therefore the corresponding color components to provide the desired black and white picture.

When an IR video signal is present, its amplitude at the plate of the vacuum tube V2 is modified by the amplitude of the visual video signal because of the remote cutoff, i.e., variable amplication, characteristics of the vacuum tube V2. More specifically, the diode D1 and capacitor C1 are connected to the vacuum tube V1 to provide a potential signal corresponding to the DC component to the visual video signals. Thus, the amplitude of the IR video signal is amplified by a variable gain dependent upon the DC component of the visual video signal. The function of this automatic gain control stage, i.e., vacuum tube V2, is to make the picture hue as displayed upon the cathode ray tube 130 independent of the amplitude of the visual video signal. If this feature were not included, a scene of low illumination would be displayed in more saturated color than if the scene were brightly illuminated. In accordance with this invention, hue is intended to convey scene temperature information and it is therefore desirable to display hue relatively independent of the visual video signal amplitude. The bias voltage of the vacuum tube V2 is selected to permit an image corresponding to the infrared radiation to be displayed when no visual video signal is applied to the vacuum tube V1.

When an IR signal is applied to the vacuum tube V2, positive signals are applied to the vacuum tube V5 which in turn applies a positive signal through the resistor R22, to the vacuum tube V7 to thereby increase the intensity of the electron emission from the electron gun 132. At the same time, positive signals are applied respectively to the grid elements of the vacuum tubes V8 and V9 to decrease the electron intensity of the beams emitted from the electron guns 134 and 136. As a result, objects of warmer temperature corresponding to a positive IR video signal are displayed in orange or red hues. In a similar manner, negative signals are applied to the vacuum tube V6, which in turn applies positive signals to the vacuum tubes V7 and V9 and a negative signal to the grid element of vacuum tube V8. As a result, those objects of cooler temperature corresponding to negative IR video signals are displayed as green or purple images.

Thus, there has been shown and described a new and improved system displaying images corresponding to at least two video input signals of different spectral bands. More specifically, in the absence of the second video signal, the first video signal is applied to a display device such as a conventional color cathode ray tube to generate a black and white picture. When video signals of the second band are present, these signals are so applied and processed so that various hues of color are presented upon the cathode ray tube dependent upon the amplitude and therefore the particular characteristics of the viewed scene. In this manner, information corresponding to the second spectral band may be readily recognized as being distinct from the information contained in the first video signal. Further, the presentation of the image corresponding to the second band is not dependent upon the intensity of the first video signal and either a black and white, or color image may be displayed individually or simultaneously without interferring with the display of the other image.

Numerous changes may be made in the above described apparatus and the different embodiments of the invention may be made without departing from the spirit thereof; therefore, it is intended that all matter contained in the foregoing description and in the accompanying drawings, shall be interpreted as illustrative and not in a limiting sense.

What is claimed is:

1. Display system for sensing first and second images derived from a scene and comprising respectively first and second spectral bands, and for displaying the first and second images to provide easy recognition of the information contained in each of the first and second spectral bands, said display system comprising:

first sensor means for sensing the first radiation image of the first spectral band and for providing a first video signal corresponding thereto;

second sensor means for sensing the second radiation image of the second spectral band and for providing a second video signal corresponding thereto;

circuit means responsive to the first and second video signals for varying the amplitude of the second signal as a function of the first signal; and display means responsive to the first video signal for displaying in black and white the first image (in a first mode) and responsive to the second signal as varied for displaying the second image (in a second mode) in color, whereby the hues of the colored second image are substantially independent of the amplitude of the first signal.

2. Display system as claimed in claim 1, wherein said display means comprises first, second and third electron guns for directing respectively first, second and third electron beams onto a display surface having the property of generating in response to the first, second and third electron beams radiation of the red, green and blue wavelengths, respectively.

3. Display system as claimed in claim 2, wherein said circuit means applies in the absence of the second video signal selected portions of the first video signal to said first, second and third electron guns to generate corresponding electron beams onto the display surface, so that a black and white image is displayed thereon.

4. Display system for sensing first and second images derived from a scene and comprising respectively first and second spectral bands, and for displaying the sensed images to provide easy recognition of the information contained in each of the first and second spectral bands, the scene including a first object having a high temperature relative to a selected temperature and a second object having a low temperature relative to the selected temperature, said display system comprising:

first sensor means for sensing a first radiation image derived from the scene of the first spectral band and for providing a first video signal corresponding thereto;

second sensor means for sensing a second radiation image derived from the scene of the second spectral band and for providing a second video signal corresponding thereto;

display means responsive to the first video signal in the absence of the second video signal for displaying the first image in black and white the responsive to the second video signal for superimposing color onto the black and white image dependent upon the second video signal, said display means comprising an electron discharge device having at least first and second electron guns for directing first and second electron beams onto a display surface respectively; and circuit means coupled to said first and second sensor means for supplying selected portion of the first video signal to said first and second electron guns to emit electron beams of corresponding intensities to provide the black and white picture in the absence of the second video signal and for processing the second video signal so that its amplitude varies about a predetermined level corresponding to the selected temperature and having a positive amplitude with respect to the reference level corresponding to the first object and having a negative amplitude with respect to the reference level corresponding to the second object.

5. The display system as claimed in claim 4, wherein the processed second video signal is applied in selected proportion to each of said first and second electron guns to display upon said display surface (a) the first object in a first hue and (a) the second object in a second, different hue.

6. Display system for sensing first and second images derived from a scene and comprising respectively first and second spectral bands, and for displaying the first and second images to provide easy recognition of information contained in each of the first and second spectral bands, said display system comprising:

first sensor means for sensing the radiation image of the first spectral band and for providing a first video signal correspnding thereto;

second sensor means for sensing the radiation image of the second spectral band and for providing a second video signal corresponding thereto;

circuit means responsive to the first and second video signals for varying the amplitude of the second signal as a function of the first signal; and display means responsive to the first video signal for displaying the first image in a first mode and responsive to the second signal for displaying the second image in a second mode substantially independent of the amplitude of the first signal, said display means comprising first, second and third electron guns for directing respectively first, second and third electron beams onto a display surface having a property of generating in response to the first, second and third electron beams radiation of the red, green and blue wave lengths, respectively;

said circuit means in said first mode applying in the absence of the second video signal selected portions of the first video signal to said first, second and third electron guns to generate corresponding electron beams onto the display surface so that a black and white image is displayed thereon and in the second mode, intensifying electron emission of said first electron gun in response to a positive portion of the second video signal and intensifying electron emission of at least said second electron in response to a negative portion of the second video signal.

7. Display system as claimed in claim 6, wherein said circuit means is responsive to the positive (proportion) portion of the second video signal to intensify electron emission of said first electron gun and to decrease the intensity of elecron emission of said second and third electron guns and responsive to that negative portion of the second video signal to intensify the electron emission of said second and third electron guns and to decrease the intensity of electron emission from said first electron gun.

* * * * *